US010313076B2

(12) United States Patent
Lindoff et al.

(10) Patent No.: US 10,313,076 B2
(45) Date of Patent: Jun. 4, 2019

(54) WIRELESS COMMUNICATION DEVICE, NETWORK NODE, METHODS AND COMPUTER PROGRAMS FOR AIDING FINDING OF SYNCHRONISATION SIGNALS

(71) Applicant: Telefonaktiebolaget LM Ericsson (publ), Stockholm (SE)

(72) Inventors: Bengt Lindoff, Bjarred (SE); Peter Alriksson, Horby (SE); Magnus Astrom, Lund (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 42 days.

(21) Appl. No.: 15/604,136

(22) Filed: May 24, 2017

(65) Prior Publication Data

US 2018/0323922 A1    Nov. 8, 2018

(30) Foreign Application Priority Data

May 4, 2017    (EP) ..................................... 17169554

(51) Int. Cl.
*H04L 5/00*    (2006.01)
*H04W 36/00*    (2009.01)
(Continued)

(52) U.S. Cl.
CPC ........... *H04L 5/0048* (2013.01); *H04W 16/14* (2013.01); *H04W 36/00* (2013.01); *H04W 56/001* (2013.01); *H04W 72/0453* (2013.01)

(58) Field of Classification Search
CPC .. H04L 5/0048; H04W 16/14; H04W 56/001; H04W 72/0453
See application file for complete search history.

(56) References Cited

U.S. PATENT DOCUMENTS

| 8,724,545 B2 * | 5/2014 | Dayal | H04W 16/14 370/328 |
| 2007/0037594 A1 * | 2/2007 | Palenius | H04W 36/0088 455/502 |

(Continued)

FOREIGN PATENT DOCUMENTS

| EP | 3018938 A1 | 5/2016 |
| WO | 2012171215 A1 | 12/2012 |

OTHER PUBLICATIONS

European Communication dated Nov. 7, 2017, with European Search Report dated Oct. 30, 2017, in connection with EP Application No. 17169554.7, 11 pages.

*Primary Examiner* — Duc C Ho
(74) *Attorney, Agent, or Firm* — Leffler Intellectual Property Law, PLLC (57) ABSTRACT

A method of a network node of a cellular communication system for mobility from a first radio access network, RAN, operating using a first radio access technology, RAT, to a second RAN operating using a second RAT. The first RAT has synchronization signals with a first frequency allocation and the second RAT has synchronization signals with a second frequency allocation in relation to a network frequency for the second RAT. The method comprises determining allocation information about the synchronization signals of the second RAT, and transmitting a radio resource control, RRC, message including the allocation information about the synchronization signals of the second RAT. A method for the wireless communication device is also disclosed, as well as a network node, a wireless communication device and computer programs for them.

25 Claims, 4 Drawing Sheets

(51) Int. Cl.
*H04W 56/00* (2009.01)
*H04W 16/14* (2009.01)
*H04W 72/04* (2009.01)

(56) References Cited

U.S. PATENT DOCUMENTS

2013/0203452 A1    8/2013  Awoniyi et al.
2014/0349664 A1   11/2014  Pedersen et al.
2015/0289219 A1*  10/2015  Kim .................. H04W 56/0015
                                                              370/350
2017/0019819 A1*   1/2017  Yang .................... H04B 7/1855

* cited by examiner

WIRELESS COMMUNICATION DEVICE, NETWORK NODE, METHODS AND COMPUTER PROGRAMS FOR AIDING FINDING OF SYNCHRONISATION SIGNALS

CROSS-REFERENCE TO RELATED APPLICATIONS

This application claims priority under 35 U.S.C. § 119 of European Patent Application No. EP17169554.7, filed on May 4, 2017, which application is hereby incorporated herein by reference in its entirety.

TECHNICAL FIELD

The present invention generally relates to a wireless communication device, a network node, and to methods performed in respective entities, as well as computer programs for implementing the methods. In particular, the present invention relates to aiding the wireless communication device to find synchronisation signals, for mobility purposes, of a radio access network having a certain allocation of synchronisation signals in view of a carrier frequency used by the radio access network.

BACKGROUND

Synchronization signals exist to allow a wireless communication device operating in a cellular communication system, e.g. referred to as User Equipment (UE), to find the correct time and frequency relative a base station or access point, e.g. referred to as access network node or simply network node of a radio access network (RAN). Synchronisation signal are normally transmitted periodically, e.g. every 5 ms for $3^{rd}$ Generation Partnership Project (3GPP) Long Term Evolution (LTE) system, but a forecast is that in coming systems, e.g. in 3GPP New Radio (NR) system it will likely be longer, e.g. 20 ms for initial access, but other systems and/or situations may have even longer periods, say up to 160 ms. The different systems, as indicated above, are considered to use different radio access technologies (RATs). The wideband code division multiplex access (WCDMA) is another example of a RAT for cellular communication. The NR synchronisation process is divided into two stages in which the first stage achieves time and a rough frequency control and the second stage provides a finer frequency control. Primary and secondary synchronization signals (PSS/SSS) are self-contained in that by successfully detecting one instance of PSS and one instance of SSS, the UE acquires information on physical cell identity and timing, after which it has sufficient knowledge to decode a physical broadcast channel (PBCH).

Figure 8:
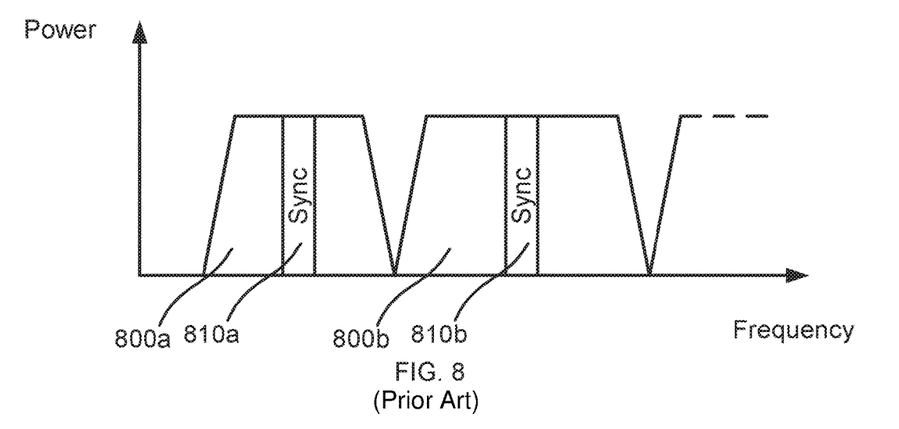
FIG. 8 is a frequency diagram schematically illustrating symmetrical and/or fixed synchronisation signal allocation with respect to a network frequency.
Figure 9:
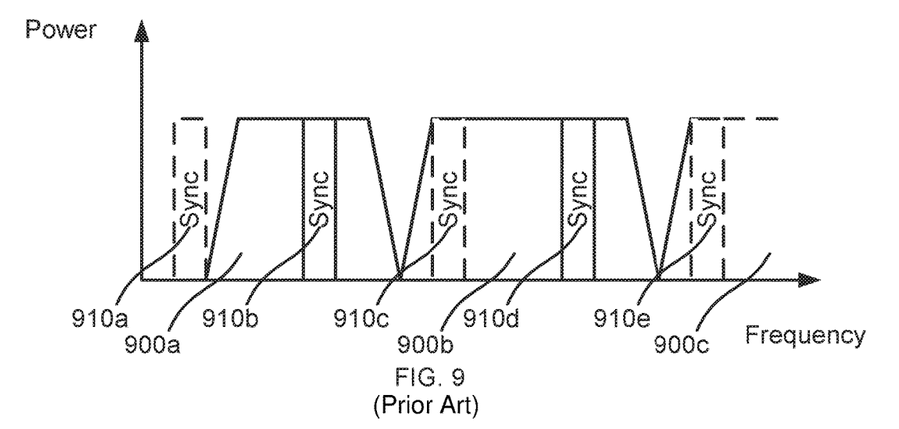
FIG. 9 is a frequency diagram schematically illustrating asymmetrical and/or flexible synchronisation signal allocation with respect to a network frequency.

A key feature of the NR, which also is referred to as $5^{th}$ Generation (5G) system, is to provide a lean carrier. That means that only a minimum of overhead in terms of broadcast messaging, or always-on messages will be transmitted. One consequence of that is that synchronisation signal deployment and detection will be slightly different compared with for example the LTE. In LTE, synchronisation signals are symmetrically positioned to the centre of the bandwidth, i.e., in a position relative to the network bandwidth, which implies that since it is possible to detect the network bandwidth, it is also possible to detect its centre frequency. This is schematically illustrated in FIG. 8. In NR, due to the lean design with few synchronisation signal instances per time and/or frequency, there may not be sufficient signal power to detect the synchronisation signals to detect the carrier bandwidth, or long averaging times would be required, another approach is desired. A consequence of that is that synchronisation signals may not necessarily be positioned symmetrically to the centre of the carrier, but may instead be positioned at predefined, absolute frequencies seemingly arbitrary to the network bandwidth. Furthermore, for network flexibility reasons, several synchronisation positions may exist within a network bandwidth, and may vary depending on configuration. This is schematically illustrated in FIG. 9.

It should be noted that the terms "network bandwidth", "carrier bandwidth", "network carrier bandwidth", "system bandwidth", etc. are interchangeably used in this disclosure and means the bandwidth in which the UE for the moment performs or intends to perform communication activities. Similarly, the terms "network frequency", "carrier frequency", "network carrier frequency", "system frequency", etc. are interchangeably used in this disclosure and means a frequency (reference within the bandwidth, e.g. at centre of the bandwidth) at which the UE for the moment performs or intends to perform communication activities.

Inter-RAT (IRAT) handover (HO) is the procedure of a UE changing RATs, from e.g., LTE to NR in active mode. Typically, this procedure also involves changing carrier frequencies and base station. Hence, one step of the IRAT HO procedure is to briefly change frequency to detect and synchronize towards the new RAT network. In legacy 4G systems such as the LTE, inter-frequency and IRAT mobility measurements and inter-frequency positioning, such as for example by observed time difference of arrival (OTDOA), are carried out in measurement gaps that are 6 ms long with periodicity of 40 or 80 ms depending on configuration. To simplify measurements, the UE in active mode may receive IRAT information in dedicated system information messages prior to the measurement, regarding what frequency to make measurements on and optionally candidate cells to search for.

The synchronisation signal in NR will not necessarily be on the system bandwidth (BW) on the carrier frequency. This is unlike what is the case in for example the LTE, where the sync signal always is centred around the carrier frequency. This might be a problem for multi-RAT UEs since during IRAT handover from systems like LTE or WCDMA to NR, the UE is unaware about where the synchronisation signal is allocated in the system BW. IRAT messages such as radio resource control (RRC) messages traditionally only constitute of carrier frequency information, and inherently RAT indication. If no synchronisation signal information is signalled, the UE need to search blindly for the synchronisation signal over the entire resources (time and frequency). The synchronisation time, i.e. time from IRAT measurements are triggered to when actual HO can be made, may be significantly delayed, which implies larger risk for dropped connection, lagging and hence worse user experience. It is therefore a desire to aid the UE in finding synchronisation signals more efficiently.

SUMMARY

The invention is based on the inventors' understanding that flexible RATs put demands on handling the flexibility. The inventors suggest that an RRC message should include allocation information about the synchronisation signals and an approach for handling this.

According to a first aspect, there is provided a method of a wireless communication device of a cellular communication system for mobility from a first radio access network, RAN, operating using a first radio access technology, RAT, to a second RAN operating using a second RAT. The first RAT has synchronisation signals with a first frequency allocation and the second RAT has synchronisation signals with a second frequency allocation in relation to a network frequency for the second RAT. The method comprises receiving a radio resource control, RRC, message including allocation information about the synchronisation signals of the second RAT, and performing synchronisation signal detection based on the allocation information.

The first and second RATs may use different access technologies where the second frequency allocation is different from the first frequency allocation in relation to the network frequency. Alternatively, the first and second RATs may use the same access technology but the second frequency allocation is different from the first frequency allocation in relation to the network frequency.

The allocation information may comprise specific frequency information for the synchronisation signals. Alternatively, the allocation information may comprise a frequency offset for the synchronisation signal frequency in relation to the network frequency.

The RRC message may be any of an RRCConnectionReconfiguration message containing MeasConfig configuring inter-RAT or inter-frequency measurements, and an RRCConnectionRelease message with redirectedCarrierInfo or idleModeMobilityControlInfo.

The RRC message may be received when initiating a handover procedure or at a connection release procedure, or the RRC message may be a broadcast message containing cell re-selection information.

The method may further comprise tracking time and frequency at a release to idle or inactive mode.

The performing of synchronisation signal detection may comprise changing receiver frequency based on the frequency allocation of the synchronisation signals such that synchronisation signals are comprised in a received bandwidth, monitoring within the received bandwidth for synchronisation signals, and decoding, upon found synchronisation signals, the synchronisation signals.

The method may comprise, after performing synchronisation signal detection, tuning the receiver frequency to the determined network frequency.

The method may further comprise determining, upon successful synchronisation, allocation information about the synchronisation signals of the RAT on which the successful synchronisation has been performed, and transmitting, to the network node or neighbouring network nodes of the network node, information about the RAT on which the successful synchronisation has been performed including the information about the allocation information of the synchronisation signals of the RAT on which the successful synchronisation has been performed.

According to a second aspect, there is provided a wireless communication device arranged to operate in a cellular communication system and capable of mobility from a first radio access network, RAN, operating using a first radio access technology, RAT, to a second RAN operating using a second RAT. The first RAT has synchronisation signals with a first allocation and the second RAT has synchronisation signals with a second frequency allocation in relation to a network frequency for the second RAT. The wireless communication device comprises a transceiver and a controller. The transceiver is arranged to receive a radio resource control, RRC, message including allocation information about the synchronisation signals of the second RAT. The controller is arranged to cause the transceiver to perform synchronisation signal detection based on the allocation information.

The first and second RATs may use different access technologies where the second frequency allocation is different from the first frequency allocation in relation to the network frequency. Alternatively, the first and second RATs may use the same access technology but the second frequency allocation is different from the first frequency allocation in relation to the network frequency.

The allocation information may comprise specific frequency information for the synchronisation signals. Alternatively, the allocation information may comprise a frequency offset for the synchronisation signal frequency in relation to the network frequency.

The RRC message may be an RRCConnectionReconfiguration message containing MeasConfig configuring inter-RAT or inter-frequency measurements or an RRCConnectionRelease message with redirectedCarrierInfo or idleModeMobilityControlInfo.

The RRC message may be received when a handover setup procedure is initiated or at a connection release procedure, or be a broadcast message containing cell re-selection information.

The wireless communication device may be arranged to, when synchronisation signal detection is made, track time and frequency at a release to idle or inactive mode.

The wireless communication device may be arranged to perform the synchronisation signal detection by being arranged to change receiver frequency of the transceiver based on the frequency allocation of the synchronisation signals such that synchronisation signals are comprised in a received bandwidth, monitor within the received bandwidth for synchronisation signals, and decode, upon found synchronisation signals, remaining synchronisation signals of a system network access signalling transmission.

The wireless communication device may be arranged to, after performing synchronisation signal detection, tune the receiver frequency of the transceiver to the determined network frequency.

The wireless communication device may be arranged to determine, upon successful synchronisation, allocation information about the synchronisation signals of the RAT on which the successful synchronisation has been performed, and transmit, to neighbouring network nodes of the network node, information about the RAT on which the successful synchronisation has been performed including the information about the allocation information of the synchronisation signals of the RAT on which the successful synchronisation has been performed.

According to a third aspect, there is provided a method of a network node of a cellular communication system for mobility from a first radio access network, RAN, operating using a first radio access technology, RAT, to a second RAN operating using a second RAT. The first RAT has synchronisation signals with a first frequency allocation and the second RAT has synchronisation signals with a second frequency allocation in relation to a network frequency for the second RAT. The method comprises determining allocation information about the synchronisation signals of the second RAT, and transmitting a radio resource control, RRC, message including the allocation information about the synchronisation signals of the second RAT.

The first and second RATs may use different access technologies where the second frequency allocation is different from the first frequency allocation in relation to the network frequency. Alternatively, the first and second RATs may use the same access technology but the second frequency allocation is different from the first frequency allocation in relation to the network frequency.

The allocation information may comprise specific frequency information for the synchronisation signals. Alternatively, the allocation information may comprise a frequency offset for the synchronisation signal frequency in relation to the network frequency.

The RRC message may be an RRCConnectionReconfiguration message containing MeasConfig configuring inter-RAT or inter-frequency measurements or the RRC message is an RRCConnectionRelease message with redirectedCarrierInfo or idleModeMobilityControlInfo.

The RRC message may be transmitted when initiating a handover procedure or at a connection release procedure.

The RRC message may be a broadcast message containing cell re-selection information.

The determining of the allocation information about the synchronisation signals of the second RAT may comprise receiving through signalling from the cellular communication system information about the second RAT, and extracting information about the allocation information of the synchronisation signals of the second RAT from the information about the second RAT.

The determining of the allocation information about the synchronisation signals of the second RAT may comprise estimating likely allocation information about the synchronisation signals of the second RAT.

The determining of the allocation information about the synchronisation signals of the second RAT may comprise acquiring through signalling, from other wireless devices operating in the cellular communication network, information about the second RAT, and extracting information about the allocation information of the synchronisation signals of the second RAT from the information about the second RAT.

According to a fourth aspect, there is provided a network node arranged to operate in a cellular communication system and capable of assisting handover from a first radio access technology, RAT, to a second RAT. The second RAT has synchronisation signals with a frequency allocation in relation to a network frequency for the second RAT. The network node comprises a transceiver and a controller. The controller is arranged to determine allocation information about the synchronisation signals of the second RAT. The transceiver is arranged to transmit a radio resource control, RRC, message including the allocation information about the synchronisation signals of the second RAT.

The first and second RATs may use different access technologies where the second frequency allocation is different from the first frequency allocation in relation to the network frequency. Alternatively, the first and second RATs may use the same access technology but the second frequency allocation is different from the first frequency allocation in relation to the network frequency.

The allocation information may comprise specific carrier frequency of the synchronisation signals. Alternatively, the allocation information comprises a frequency offset for carrier frequency of the synchronisation signal in relation to the network frequency.

The RRC message may be an RRCConnectionReconfiguration message containing MeasConfig configuring inter-RAT or inter-frequency measurements, or an RRCConnectionRelease message with redirectedCarrierInfo or idleModeMobilityControlInfo.

The RRC message may be transmitted when initiating a handover procedure or at a connection release procedure.

The RRC message may be a broadcast message containing cell re-selection information.

To determine the allocation information about the synchronisation signals of the second RAT may include that an interface of the network node is arranged to receive, through signalling from the cellular communication system, information about the second RAT, and the controller is arranged to extract information about the allocation information of the synchronisation signals of the second RAT from the information about the second RAT.

To determine the allocation information about the synchronisation signals of the second RAT may include that the controller is arranged to estimate likely allocation information about the synchronisation signals of the second RAT.

To determine the allocation information about the synchronisation signals of the second RAT may include that the transceiver is arranged to acquire, through signalling from other wireless devices operating in the cellular communication network, information about the second RAT, and the controller is arranged to extract information about the allocation information of the synchronisation signals of the second RAT from the information about the second RAT.

According to a fifth aspect, there is provided a computer program comprising instructions which, when executed on a processor of a wireless communication device, causes the wireless communication device to perform the method according to the first aspect.

According to a sixth aspect, there is a computer program comprising instructions which, when executed on a processor of a network node, causes the network node to perform the method according to the third aspect.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

FIG. 8 is a frequency diagram schematically illustrating symmetrical and/or fixed synchronisation signal allocation with respect to a network frequency. A network carrier with its bandwidth 800a, 800b is defined by the cellular network, and the carrier may for example be identified by an absolute radio-frequency channel number, ARFCN, which may be considered as a code that specifies a physical radio carrier used for transmission and reception in a land mobile radio system. The mapping between this code and the actual physical frequency may be different for different RATs. Further, synchronisation signals 810a, 810b are provided within the respective bandwidths 800a, 800b. The synchronisation signals 810a, 810b are fixed, i.e. they are always, at least for a same communication mode, allocated to the same parts of the bandwidth. In other words, they are fixed relative to the network bandwidth or network frequency. They can further, as illustrated in FIG. 8, be centred in the bandwidth 800a, 800b. An example of a RAT employing this is the LTE.

FIG. 9 is a frequency diagram schematically illustrating asymmetrical and/or flexible synchronisation signal allocation with respect to a network frequency. Some RATs have inherently a very flexible allocation of different resources, and among them the allocation of synchronisation signals. A network carrier with its bandwidth 900a, 900b, 900c is defined by the cellular network. FIG. 9 is drawn to be interpreted in different ways for different approaches of allocating a few or all of the illustrated synchronisation signals 910a, 910b, 910c, 910d, 910e, among which a few examples of feasible approaches will be elucidated here.

One approach is to provide synchronisation signals 910a, 910b, 910c, 910d, 910e at regular frequency intervals. Another similar approach is to only provide the synchronisation signals 910a, 910c, 910e, indicated with hashed lines. Their allocation in relation to the carrier bandwidths 900a, 900b, 900c, which also may be flexibly allocated, may differ from one carrier to another, and where the synchronisation signal even may be close to the bandwidth boundary, e.g. as synchronisation signal 910c in relation to the carrier bandwidth 900b, or even slightly outside the bandwidth, e.g. as synchronisation signal 910a in relation to the carrier bandwidth 900a assumed that synchronisation signal 910b is not present.

Another approach is to provide synchronisation signals 910b, 910d, i.e. synchronisation signals 910a, 910c and 910e are not used in this approach, indicated with solid lines, for respective carriers with bandwidths 900a, 900b. The synchronisation signals 910b, 910d then appear asymmetrically, i.e. not centred around the network frequency, in the bandwidths 900a, 900b, e.g. at different distances in frequency from a centre frequency of the bandwidths 900a, 900b.

A further approach is that there is more than one synchronisation signal frequency, e.g. synchronisation signals 910c, 910d for network carrier with bandwidth 900b. For that case, the synchronisation signal allocation information provided as demonstrated below may be about one of the synchronisation signals 910c, 910d, or about both the synchronisation signals 910c, 910d, and the wireless communication device can act accordingly.

Synchronisation signal frequency is a frequency from which the synchronisation signal, e.g. band or frequency distribution, may be determined. It may be the synchronisation centre frequency, or either end of the sync frequency, or some other frequency from which the synchronisation signal may be determined frequency-wise.

A reason for some of the approaches demonstrated above is that a UE may need some additional information when performing sync search to reduce complexity in a lean carrier setup, where network bandwidths may not necessarily be detectable since nothing is presently transmitted. Using absolute candidate synchronisation frequency positions is one means of doing that. Another reason for an approach to provide the synchronisation signal according to any of the approaches above is that allocation of the bandwidths may be flexible, wherein the allocation of synchronisation signals is not feasible or at least hard to keep fixed. Another reason may be that the amount of synchronisation signals is desired to be kept low, i.e. to reduce overhead, wherein the flexible provision of synchronisation signals is a way to achieve this. Further reasons may apply based on other system design parameters.

As discussed in the introductory part of this disclosure, a straightforward approach by the wireless communication device is to search blindly for synchronisation signals. However, this may consume undue resources, e.g. in sense of time and/or energy, and may provide an unpredictable performance, e.g. in sense of time for synchronisation and/or reliability. This disclosure suggests approaches for aiding the wireless communication device for more efficiently performing synchronisation.

The synchronisation signals may in some systems be arranged in a system network access signalling transmission which may comprise a synchronisation signal block, SSB. The synchronisation signal may form a primary synchronisation signal, PSS, of the SSB which further may comprise any one of a secondary synchronisation signal, SSS, and a physical broadcast channel, PBCH, signal. Different PSSes will be used to determine a subset of all possible SSSes. PBCH contains a subset of minimum system information, and remaining minimum system information is transmitted in a physical downlink shared channel, $PDSCH_{SIB}$, and scheduled in a physical downlink control channel, $PDCCH_{SIB}$. The sequence selected for the PSS may include information about at least one of configuration of the SSS and the PBCH in relation to the PSS, configuration of the PBCH, configuration of system information on the $PDSCH_{SIB}$ configuration of another channel carrying system information such as for example a channel providing scheduling information about a channel providing system information, e.g. $PDCCH_{SIB}$ carrying scheduling information about the $PDSCH_{SIB}$, allocation of transmission resources for the another channel carrying system information, indication of whether different instances of synchronisation signal transmissions may be soft-combined, further SSB parameters, quasi-co-location of transmission points of the PSS and other parts of the SSB allocation related to the PSS, SSB transmissions which may include whether the SSB is transmitted in a beam with a first width and repeated in time or in a beam with a second width and swept over multiple directions, wherein the first width is wider than the second width, bandwidth of SSB, time division properties of SSB, and frequency division properties of SSB. Thus, the found synchronisation signals are reasonably the PSS and the remaining synchronisation signals may for example comprise the SSS, wherein the decoding of the remaining synchronisation signals would provide additional information to the wireless communication device, as discussed above. Other approaches for providing synchronisation signals may be equally feasible.

Figure 1:
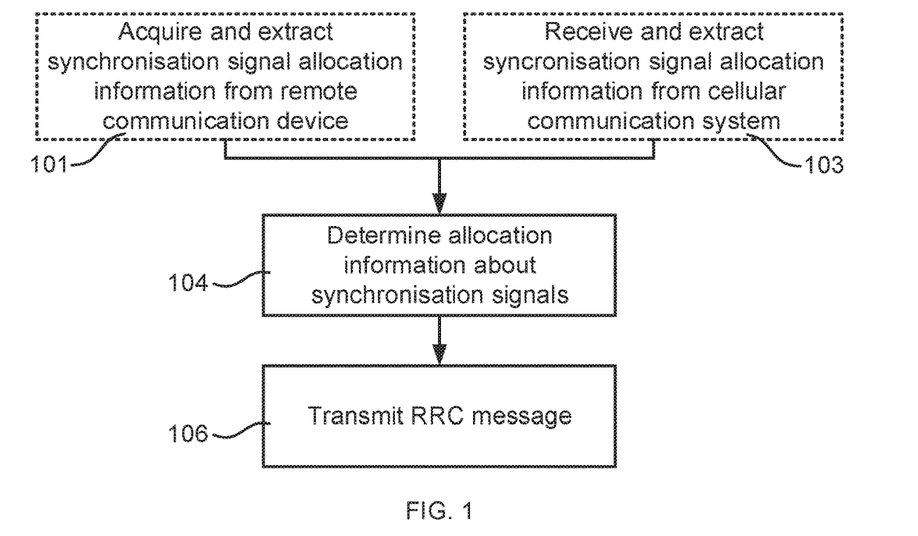
FIG. 1 is a flow chart illustrating a method for a network node according to an embodiment.

FIG. 1 is a flow chart illustrating a method for a network node according to an embodiment. The network node may be aware of synchronisation signal allocation information by different means. For example, the network node may acquire 101 and extract synchronisation information from a remote wireless communication device. Below, a further demonstration on how the remote wireless communication device provides reports on existing synchronisation signal allocation relations. Another example is that the network node receives 103 and extracts synchronisation signal allocation information from a cellular communication system in which the network node operates. This may be provided using a protocol for system information between a controlling node of the cellular communication system and the network node. Further ways may be applicable for the network node to find out the synchronisation signal allocation information, e.g. indirectly from other system information and inherent knowledge about relations between such system information and the applicable allocation. Such indirect determination may be considered as one example of estimation of the synchronisation signal allocation information. Thus, the synchronisation signal allocation information may not be fully confirmed, wherein for example a flag is added to the information telling the wireless communication device that this may be a subset of feasible allocations and not necessarily a complete list. The wireless communication device may upon detection of such a flag prioritize search for synchronisation signals based on the synchronisation signal allocation information, and if not successful switch to for example blindly searching for synchronisation signals.

The method includes determination 104 of the allocation information about the synchronisation signals. Thus, from information about synchronisation signal allocation gained in one or another way, for example as of any of the ways demonstrated above, the network node is capable of determining 104 the allocation information related to the synchronisation signals, wherein the network node forms and transmits 106 a message, e.g. a radio resource control message, including synchronisation signal allocation information to one or more wireless communication devices, e.g. a served wireless communication device. Other message types having similar function as a radio resource control message may of course be equally feasible. The wireless communication device is thus aided in finding the synchronisation signals, which will be further elucidated below.

Figure 2:
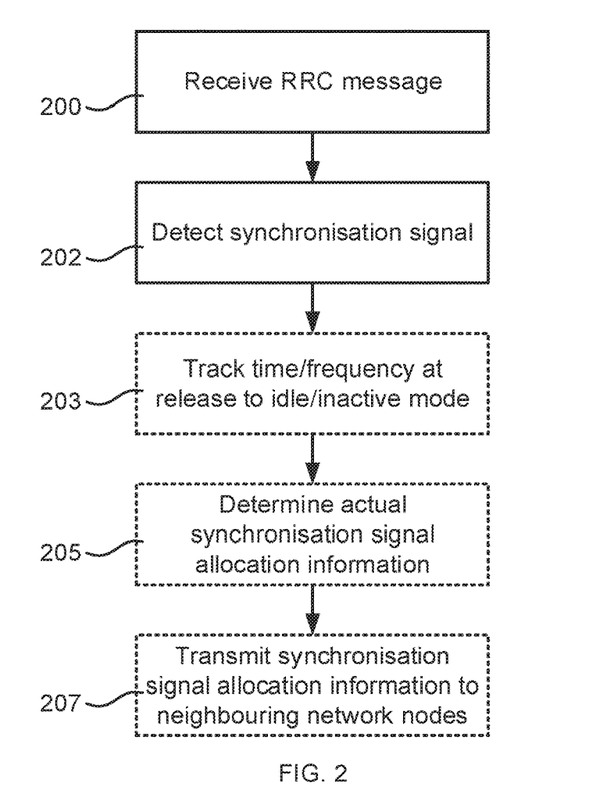
FIG. 2 is a flow chart illustrating a method for a wireless communication device according to an embodiment.

FIG. 2 is a flow chart illustrating a method for a wireless communication device according to an embodiment. The wireless communication device receives 200 a message, e.g. a radio resource control message, containing information about synchronisation signal allocation information. Based on that information, the wireless communication device is able to search for the synchronisation signals more efficiently. The synchronisation signals can thus be detected 202 faster, and operation related to the synchronisation signals, i.e. synchronising and determining system information, can be performed faster, with less effort and/or more accurately.

The methods provide for mobility from a first radio access network, RAN, operating using a first radio access technology, RAT, to a second RAN operating using a second RAT. Here, first and second RANs and/or RATs may in some cases be the same, but having different settings with regards to synchronisation signal allocation. Since the first RAT may have synchronisation signals with a first frequency allocation and the second RAT may have synchronisation signals with a second frequency allocation in relation to a network frequency, the network node may aid the wireless communication device by providing the allocation information on the established communication on the first RAT such that the wireless communication device, when searching for the synchronisation signals on the second RAT, easier can find and detect the synchronisation signals.

The first and second RATs may use different access technologies where the second frequency allocation is different from the first frequency allocation in relation to the network frequency. For example, the first RAT may use a fixed relation between network frequency and frequency allocation of synchronization signals, e.g. symmetric allocation, and the second RAT may use a frequency allocation relation between network frequency and frequencies of synchronization signals, e.g. asymmetrical allocation. The first and second RATs may use the same access technology but the second frequency allocation may be different from the first frequency allocation in relation to the network frequency. Another case may be that both the RAT and the network bandwidth are the same, but the type of synchronisation signal is different, Cf. the different examples demonstrated with reference to FIGS. 8 and 9, wherein the allocation information will be different.

The message including the synchronisation signal allocation information may include specific frequency information for the synchronisation signals, e.g. in absolute or physical frequency, or indicated according to a frequency grid. Alternatively, the allocation information comprises a frequency offset, denoted as physical frequency offset, or an offset indicated according to a frequency grid, for the synchronisation signal frequency in relation to a network frequency. Here, the network frequency is the reference on which the frequency band used between the network node and the wireless communication device is denoted. As indicated above, the message may be a radio resource control, RRC, message or a message with similar properties in sense of carrying control information. Using notation commonly used in 3GPP specifications, the RRC message can be an RRCConnectionReconfiguration message, i.e. particular RRC message providing a reconfiguration of the connection, containing MeasConfig, i.e. comprising configurations for measurements, configuring inter-RAT or inter-frequency measurements, or an RRCConnectionRelease message, i.e. an RRC message indicating a release of the connection, with redirectedCarrierInfo, i.e. information about a new carrier to be monitored after release, or idleModeMobilityControlInfo, i.e. information about mobility control at idle mode. The RRC message is for example transmitted when initiating a handover procedure or at a connection release procedure. The wireless communication device may thus track 203 time and/or frequency at a release to idle or inactive mode. The RRC message can also be a broadcast message containing cell re-selection information.

As noted above, the network node may get information about synchronisation allocation in different ways, among one is to get it from communication devices wirelessly connected to the network node, i.e. based on that the wireless communication devices provide reports on actual and experienced allocations. The method of the wireless communication device may thus further comprise determining 205, e.g. upon successful synchronisation, allocation information about the synchronisation signals of the RAT on which for example the successful synchronisation or connection has been performed or established. The wireless device then transmits 207, to the network node or neighbouring network nodes of the network node, information about the RAT on which the successful synchronisation or connection establishment has been performed including the information about the allocation information of the synchronisation signals of that RAT. This provides for that the network node may populate e.g. a list or database with information about used synchronisation signal allocations, which information then may be provided to other wireless devices according to the approach demonstrated above.

Figure 3:
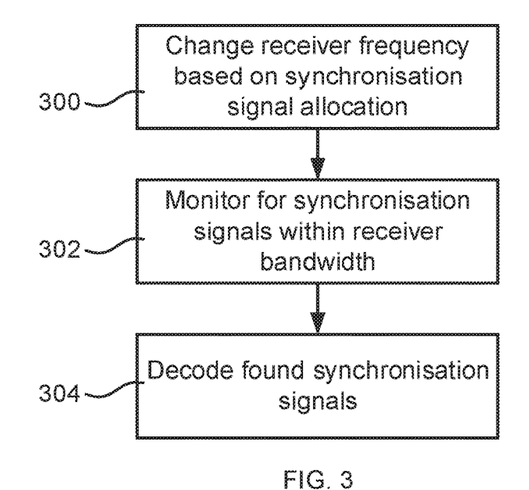
FIG. 3 is a flow chart illustrating specific parts of a method for a wireless communication device according to an embodiment.

FIG. 3 is a flow chart illustrating specific parts of a method of performing synchronisation signal detection for a wireless communication device according to an embodiment. The performing of synchronisation signal detection may comprise changing 300 receiver frequency based on the frequency allocation of the synchronisation signals such that synchronisation signals are comprised in a received bandwidth. The wireless communication device is then capable of efficiently monitoring 302 the bandwidth for synchronisation signals. Assuming that synchronisation signals are found, the wireless communication device is then able to decode the synchronisation signals. Reasonably, when at least initial synchronisation is settled, the wireless device may proceed with tuning the receiver frequency to a frequency for operating at the network frequency. This tuning frequency may be determined by the wireless communication device from control signalling from the network node.

Figure 6:
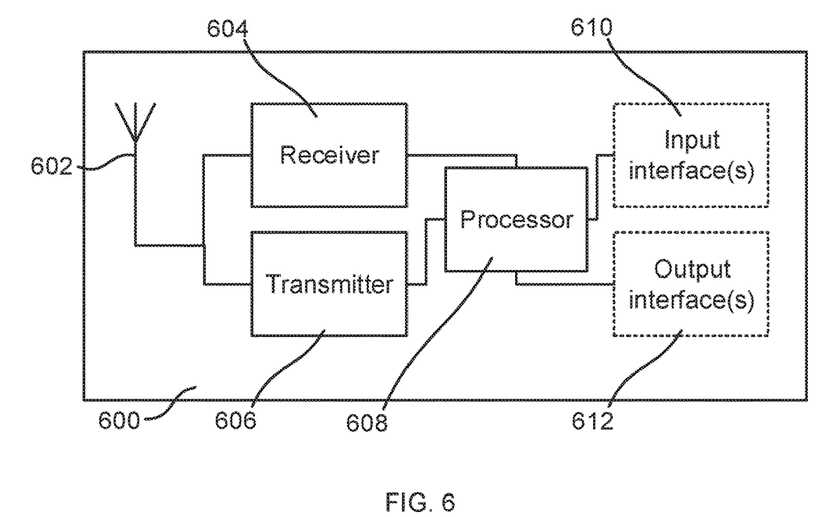
FIG. 6 is a block diagram schematically illustrating a UE according to an embodiment.

FIG. 6 is a block diagram schematically illustrating a UE 600 according to an embodiment. The UE comprises an antenna arrangement 602, a receiver 604 connected to the antenna arrangement 602, a transmitter 606 connected to the antenna arrangement 602, and a processing element 608 which may comprise one or more circuits, and optionally one or more input interfaces 610 and/or one or more output interfaces 612. The interfaces 610, 612 can be user interfaces and/or signal interfaces, e.g. electrical or optical. The UE 600 is arranged to operate in a cellular communication network. In particular, by the processing element 608 being arranged to perform the embodiments demonstrated with reference to FIGS. 2 and 3, the UE 600 is capable of efficiently finding synchronisation signals. The processing element 608 can also fulfil a multitude of tasks, ranging from signal processing to enable reception and transmission since it is connected to the receiver 604 and transmitter 606, executing applications, controlling the optional interfaces 610, 612, etc.

Figure 5:
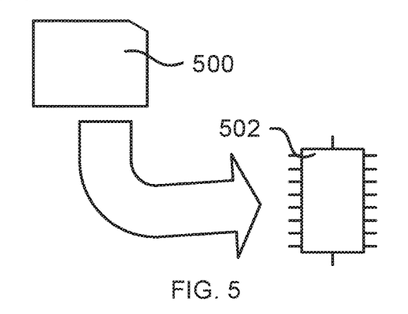
FIG. 5 schematically illustrates a computer-readable medium and a processing device for a wireless communication device.

The methods according to the present invention is suitable for implementation with aid of processing means, such as computers and/or processors, especially for the case where the processing element 608 demonstrated above comprises a processor handling searching and measurement of synchronisation signals. Therefore, there is provided computer programs, comprising instructions arranged to cause the processing means, processor, or computer to perform the steps of any of the methods according to any of the embodiments described with reference to FIGS. 2 and 3. The computer programs preferably comprise program code which is stored on a computer readable medium 500, as illustrated in FIG. 5, which can be loaded and executed by a processing means, processor, or computer 502 to cause it to perform the methods, respectively, according to embodiments of the present invention, preferably as any of the embodiments described with reference to FIGS. 2 and 3. The computer 502 and computer program product 500 can be arranged to execute the program code sequentially where actions of the any of the methods are performed stepwise. The processing means, processor, or computer 502 is preferably what normally is referred to as an embedded system. Thus, the depicted computer readable medium 500 and computer 502 in FIG. 5 should be construed to be for illustrative purposes only to provide understanding of the principle, and not to be construed as any direct illustration of the elements.

Figure 7:
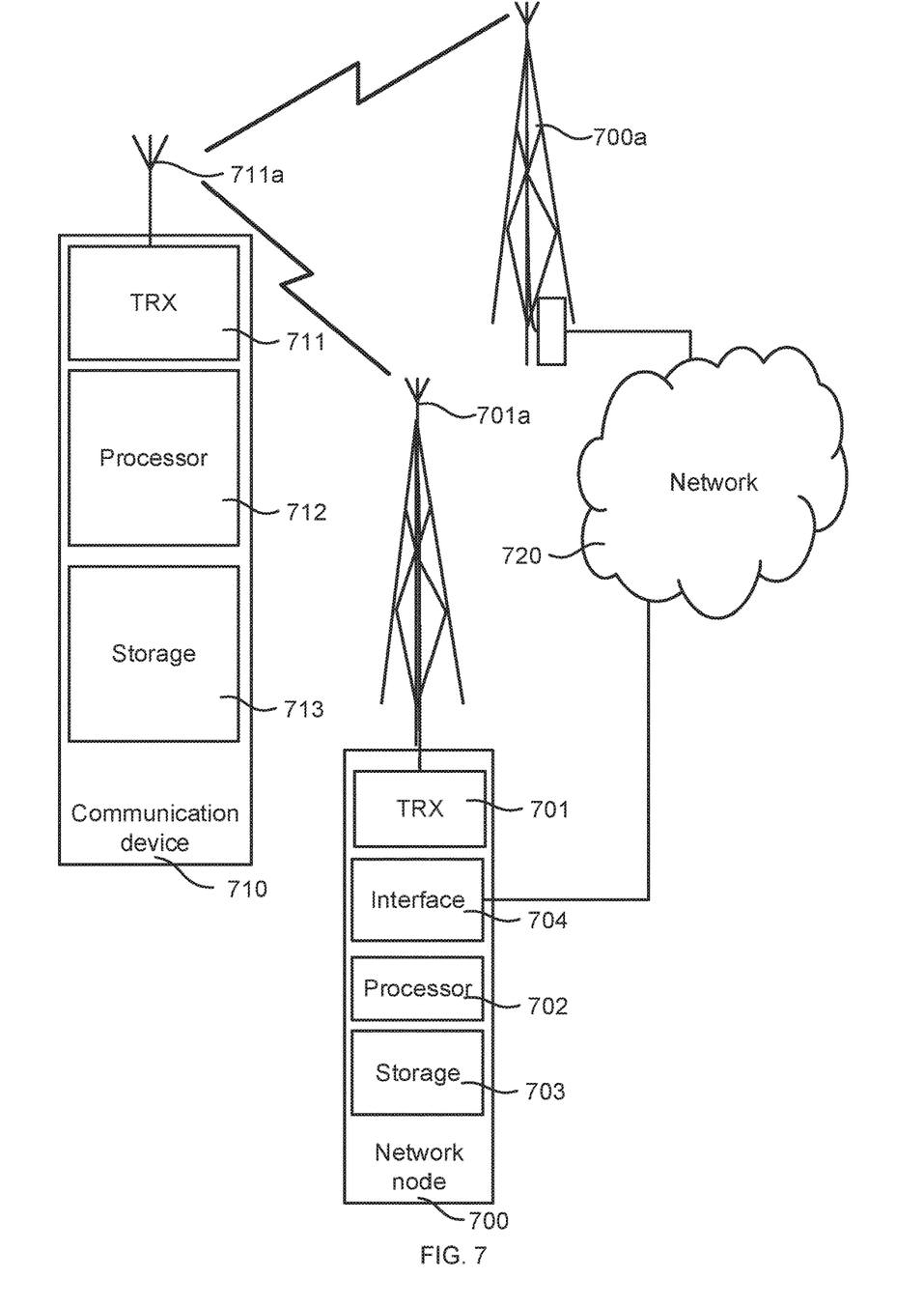
FIG. 7 schematically illustrates a communication network comprising network nodes and a wireless communication device.

FIG. 7 schematically illustrates a communication network comprising network nodes 700, 700a and a wireless communication device 710 with a more detailed view of the network node 700 and the communication device 710 in accordance with an embodiment. For simplicity, FIG. 5 only depicts core network 720, network nodes 700 and 700a, and communication device 710. Network node 700 comprises a processor 702, storage 703, interface 701, and antenna 701a. Similarly, the communication device 710 comprises a processor 712, storage 713, interface 711 and antenna 711a. These components may work together in order to provide network node and/or wireless device functionality as demonstrated above. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

The network 720 may comprise one or more IP networks, public switched telephone networks (PSTNs), packet data networks, optical networks, wide area networks (WANs), local area networks (LANs), wireless local area networks (WLANs), public land mobile networks (PLMNs), wired networks, wireless networks, metropolitan area networks, and other networks to enable communication between devices. The network 720 may comprise a network node for performing the method demonstrated with reference to FIG. 6, and/or an interface for signalling between network nodes 700, 700a.

The network node 700 comprises a processor 702, storage 703, interface 701, and antenna 701a. These components are depicted as single boxes located within a single larger box. In practice however, a network node may comprise multiple different physical components that make up a single illustrated component (e.g., interface 701 may comprise terminals for coupling wires for a wired connection and a radio transceiver for a wireless connection). Similarly, network node 700 may be composed of multiple physically separate components (e.g., a NodeB component and a radio network controller (RNC) component, a base transceiver station (BTS) component and a base station controller (BSC) component, etc.), which may each have their own respective processor, storage, and interface components. In certain scenarios in which network node 700 comprises multiple separate components (e.g., BTS and BSC components), one or more of the separate components may be shared among several network nodes. For example, a single RNC may control multiple NodeBs. In such a scenario, each unique NodeB and BSC pair, may be a separate network node. In some embodiments, network node 700 may be configured to support multiple radio access technologies (RATs). In such embodiments, some components may be duplicated (e.g., separate storage 703 for the different RATs) and some components may be reused (e.g., the same antenna 701a may be shared by the RATs).

The processor 702 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 700 components, such as storage 703, network node 700 functionality. For example, processor 702 may execute instructions stored in storage 703. Such functionality may include providing various wireless features discussed herein to a wireless communication device, such as the wireless device 710, including any of the features or benefits disclosed herein.

Storage 703 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 703 may store any suitable instructions, data or information, including software and encoded logic, utilized by the network node 700. the storage 703 may be used to store any calculations made by the processor 702 and/or any data received via the interface 701.

The network node 700 also comprises the interface 701 which may be used in the wired or wireless communication of signalling and/or data between network node 700, network 720, and/or wireless device 710. For example, the interface 701 may perform any formatting, coding, or translating that may be needed to allow network node 700 to send and receive data from the network 720 over a wired connection. The interface 701 may also include a radio transmitter and/or receiver that may be coupled to or a part of the antenna 701a. The radio may receive digital data that is to be sent out to other network nodes or wireless devices via a wireless connection. The radio may convert the digital data into a radio signal having the appropriate channel and bandwidth parameters. The radio signal may then be transmitted via antenna 701a to the appropriate recipient (e.g., the wireless device 710).

The antenna 701a may be any type of antenna capable of transmitting and receiving data and/or signals wirelessly. In some embodiments, antenna 701a may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. The antenna 701a may comprise one or more elements for enabling different ranks of SIMO, MISO or MIMO operation, or beamforming operations.

The wireless device 710 may be any type of communication device, wireless device, UE, D2D device or ProSe UE, but may in general be any device, sensor, smart phone, modem, laptop, Personal Digital Assistant (PDA), tablet, mobile terminal, smart phone, laptop embedded equipped (LEE), laptop mounted equipment (LME), Universal Serial Bus (USB) dongles, machine type UE, UE capable of machine to machine (M2M) communication, etc., which is able to wirelessly send and receive data and/or signals to and from a network node, such as network node 700 and/or other wireless devices. The wireless device 710 comprises a processor 712, storage 713, interface 711, and antenna 711a. Like the network node 700, the components of the wireless device 710 are depicted as single boxes located within a single larger box, however in practice a wireless device may comprises multiple different physical components that make up a single illustrated component (e.g., storage 713 may comprise multiple discrete microchips, each microchip representing a portion of the total storage capacity).

The processor 712 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other wireless device 710 components, such as storage 713, wireless device 710 functionality. Such functionality may include providing various wireless features discussed herein, including any of the features or benefits disclosed herein.

The storage 713 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. The storage 713 may store any suitable data, instructions, or information, including software and encoded logic, utilized by the wireless device 710. The storage 713 may be used to store any calculations made by the processor 712 and/or any data received via the interface 711.

The interface 711 may be used in the wireless communication of signalling and/or data between the wireless device 710 and the network nodes 700, 700a. For example, the interface 711 may perform any formatting, coding, or translating that may be needed to allow the wireless device 710 to send and receive data to/from the network nodes 700, 700a over a wireless connection. The interface 711 may also include a radio transmitter and/or receiver that may be coupled to or a part of the antenna 711a. The radio may receive digital data that is to be sent out to e.g. the network node 701 via a wireless connection. The radio may convert the digital data into a radio signal having the appropriate channel and bandwidth parameters. The radio signal may then be transmitted via the antenna 711a to e.g. the network node 700.

The antenna 711a may be any type of antenna capable of transmitting and receiving data and/or signals wirelessly. In some embodiments, antenna 711a may comprise one or more omni-directional, sector or panel antennas operable to transmit/receive radio signals between 2 GHz and 66 GHz. For simplicity, antenna 711a may be considered a part of interface 711 to the extent that a wireless signal is being used. The antenna 711a may comprise one or more elements for enabling different ranks of SIMO, MISO or MIMO operation, or beamforming operations.

In some embodiments, the components described above may be used to implement one or more functional modules used for enabling measurements as demonstrated above. The functional modules may comprise software, computer programs, sub-routines, libraries, source code, or any other form of executable instructions that are run by, for example, a processor. In general terms, each functional module may be implemented in hardware and/or in software. Preferably, one or more or all functional modules may be implemented by the processors 712 and/or 702, possibly in cooperation with the storage 713 and/or 703. The processors 712 and/or 702 and the storage 713 and/or 703 may thus be arranged to allow the processors 712 and/or 702 to fetch instructions from the storage 713 and/or 703 and execute the fetched instructions to allow the respective functional module to perform any features or functions disclosed herein. The modules may further be configured to perform other functions or steps not explicitly described herein but which would be within the knowledge of a person skilled in the art.

Figure 4:
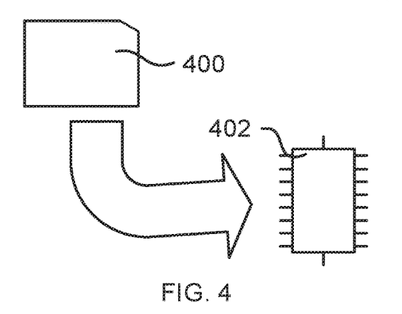
FIG. 4 schematically illustrates a computer-readable medium and a processing device for a network node.

The methods according to the present invention is suitable for implementation with aid of processing means, such as computers and/or processors, especially for the case where the processing element 702 demonstrated above comprises a processor handling searching and measurement of synchronisation signals. Therefore, there is provided computer programs, comprising instructions arranged to cause the processing means, processor, or computer to perform the steps of any of the methods according to any of the embodiments described with reference to FIG. 1. The computer programs preferably comprise program code which is stored on a computer readable medium 400, as illustrated in FIG. 4, which can be loaded and executed by a processing means, processor, or computer 402 to cause it to perform the methods, respectively, according to embodiments of the present invention, preferably as any of the embodiments described with reference to FIG. 1. The computer 402 and computer program product 400 can be arranged to execute the program code sequentially where actions of the any of the methods are performed stepwise. The processing means, processor, or computer 402 is preferably what normally is referred to as an embedded system. Thus, the depicted computer readable medium 400 and computer 402 in FIG. 4 should be construed to be for illustrative purposes only to provide understanding of the principle, and not to be construed as any direct illustration of the elements.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

This disclosure may be summarised by the following items:

1. A method of a wireless communication device of a cellular communication system for mobility from a first radio access network, RAN, operating using a first radio access technology, RAT, to a second RAN operating using a second RAT, wherein the first RAT has synchronisation signals with a first frequency allocation and the second RAT has synchronisation signals with a second frequency allocation in relation to a network frequency for the second RAT, the method comprising receiving a radio resource control, RRC, message including allocation information about the synchronisation signals of the second RAT; and performing synchronisation signal detection based on the allocation information.

2. The method of item 1, wherein the first and second RATs use different access technologies where the second frequency allocation is different from the first frequency allocation in relation to the network frequency.

3. The method of items 1, wherein the first and second RATs use the same access technology but the second frequency allocation is different from the first frequency allocation in relation to the network frequency.

4. The method of any one of items 1 to 3, wherein the allocation information comprises specific frequency information for the synchronisation signals.

5. The method of any one of items 1 to 3, wherein the allocation information comprises a frequency offset for the synchronisation signal frequency in relation to the network frequency.

6. The method of any one of items 1 to 5, wherein the RRC message is an RRCConnectionReconfiguration message containing MeasConfig configuring inter-RAT or inter-frequency measurements.

7. The method of any one of items 1 to 5, wherein the RRC message is an RRCConnectionRelease message with redirectedCarrierInfo or idleModeMobilityControlInfo.

8. The method of any one of items 1 to 7, wherein the RRC message is received when initiating a handover procedure.

9. The method of any one of items 1 to 7, wherein the RRC message is received at a connection release procedure.

10. The method of any one of items 1 to 7, wherein the RRC message is a broadcast message containing cell re-selection information.

11. The method of any one of items 1 to 10, further comprising tracking time and frequency at a release to idle or inactive mode.

12. The method of any one of items 1 to 11, wherein the performing synchronisation signal detection comprises changing receiver frequency based on the frequency allocation of the synchronisation signals such that synchronisation signals are comprised in a received bandwidth;

monitoring within the received bandwidth for synchronisation signals; and decoding, upon found synchronisation signals, the synchronisation signals.

13. The method of any one of items 1 to 12, comprising, after performing synchronisation signal detection, tuning the receiver frequency to the determined network frequency.

14. The method of any one of items 1 to 13, further comprising determining, upon successful synchronisation, allocation information about the synchronisation signals of the RAT on which the successful synchronisation has been performed; and transmitting, to the network node or neighbouring network nodes of the network node, information about the RAT on which the successful synchronisation has been performed including the information about the allocation information of the synchronisation signals of the RAT on which the successful synchronisation has been performed.

15. A wireless communication device arranged to operate in a cellular communication system and capable of mobility from a first radio access network, RAN, operating using a first radio access technology, RAT, to a second RAN operating using a second RAT, wherein the first RAT has synchronisation signals with a first allocation and the second RAT has synchronisation signals with a second frequency allocation in relation to a network frequency for the second RAT, the wireless communication device comprising a transceiver and a controller, wherein the transceiver is arranged to receive a radio resource control, RRC, message including allocation information about the synchronisation signals of the second RAT, and the controller is arranged to cause the transceiver to perform synchronisation signal detection based on the allocation information.

16. The wireless communication device of item 15, wherein the first and second RATs use different access technologies where the second frequency allocation is different from the first frequency allocation in relation to the network frequency.

17. The wireless communication device of item 15, wherein the first and second RATs use the same access technology but the second frequency allocation is different from the first frequency allocation in relation to the network frequency.

18. The wireless communication device of any one of items 15 to 17, wherein the allocation information comprises specific frequency information for the synchronisation signals.

19. The wireless communication device of any one of items 15 to 17, wherein the allocation information comprises a frequency offset for the synchronisation signal frequency in relation to the network frequency.

20. The wireless communication device of any one of items 15 to 19, wherein the RRC message is an RRCConnectionReconfiguration message containing MeasConfig configuring inter-RAT or inter-frequency measurements.

21. The wireless communication device of any one of items 15 to 19, wherein the RRC message is an RRCConnectionRelease message with redirectedCarrierInfo or idleModeMobilityControlInfo.

22. The wireless communication device of any one of items 15 to 21, wherein the RRC message is received when a handover setup procedure is initiated.

23. The wireless communication device of any one of items 15 to 21, wherein the RRC message is received at a connection release procedure.

24. The wireless communication device of any one of items 15 to 21, wherein the RRC message is a broadcast message containing cell re-selection information.

25. The wireless communication device of any one of items 15 to 24, further being arranged to, when synchronisation signal detection is made, track time and frequency at a release to idle or inactive mode.

26. The wireless communication device of any one of items 15 to 25, arranged to perform the synchronisation signal detection by being arranged to change receiver frequency of the transceiver based on the frequency allocation of the synchronisation signals such that synchronisation signals are comprised in a received bandwidth;

monitor within the received bandwidth for synchronisation signals; and decode, upon found synchronisation signals, remaining synchronisation signals of a system network access signalling transmission.

27. The wireless communication device of any one of items 15 to 26, arranged to, after performing synchronisation signal detection, tune the receiver frequency of the transceiver to the determined network frequency.

28. The wireless communication device of any one of items 15 to 27, further being arranged to determine, upon successful synchronisation, allocation information about the synchronisation signals of the RAT on which the successful synchronisation has been performed; and transmit, to neighbouring network nodes of the network node, information about the RAT on which the successful synchronisation has been performed including the information about the allocation information of the synchronisation signals of the RAT on which the successful synchronisation has been performed.

29. A method of a network node of a cellular communication system for mobility from a first radio access network, RAN, operating using a first radio access technology, RAT, to a second RAN operating using a second RAT, wherein the first RAT has synchronisation signals with a first frequency allocation and the second RAT has synchronisation signals with a second frequency allocation in relation to a network frequency for the second RAT, the method comprising determining allocation information about the synchronisation signals of the second RAT; and transmitting a radio resource control, RRC, message including the allocation information about the synchronisation signals of the second RAT.

30. The method of item 29, wherein the first and second RATs use different access technologies where the second frequency allocation is different from the first frequency allocation in relation to the network frequency.

31. The method of items 29, wherein the first and second RATs use the same access technology but the second frequency allocation is different from the first frequency allocation in relation to the network frequency.

32. The method of any one of items 29 to 31, wherein the allocation information comprises specific frequency information for the synchronisation signals.

33. The method of any one of items 29 to 31, wherein the allocation information comprises a frequency offset for the synchronisation signal frequency in relation to the network frequency.

34. The method of any one of items 29 to 33, wherein the RRC message is an RRCConnectionReconfiguration message containing MeasConfig configuring inter-RAT or inter-frequency measurements.

35. The method of any one of items 29 to 33, wherein the RRC message is an RRCConnectionRelease message with redirectedCarrierInfo or idleModeMobilityControlInfo.

36. The method of any one of items 29 to 35, wherein the RRC message is transmitted when initiating a handover procedure.

37. The method of any one of items 29 to 35, wherein the RRC message is transmitted at a connection release procedure.

38. The method of any one of items 29 to 35, wherein the RRC message is a broadcast message containing cell re-selection information.

39. The method of any one of items 29 to 38, wherein the determining of the allocation information about the synchronisation signals of the second RAT comprises receiving through signalling from the cellular communication system information about the second RAT; and extracting information about the allocation information of the synchronisation signals of the second RAT from the information about the second RAT.

40. The method of any one of items 29 to 39, wherein the determining of the allocation information about the synchronisation signals of the second RAT comprises estimating likely allocation information about the synchronisation signals of the second RAT.

41. The method of any one of items 29 to 40, wherein the determining of the allocation information about the synchronisation signals of the second RAT comprises acquiring through signalling, from other wireless devices operating in the cellular communication network, information about the second RAT; and extracting information about the allocation information of the synchronisation signals of the second RAT from the information about the second RAT.

42. A network node arranged to operate in a cellular communication system and capable of assisting handover from a first radio access technology, RAT, to a second RAT, wherein the second RAT has synchronisation signals with a frequency allocation in relation to a network frequency for the second RAT, the network node comprising a transceiver and a controller, wherein the controller is arranged to determine allocation information about the synchronisation signals of the second RAT, and the transceiver is arranged to transmit a radio resource control, RRC, message including the allocation information about the synchronisation signals of the second RAT.

43. The network node of item 42, wherein the first and second RATs use different access technologies where the second frequency allocation is different from the first frequency allocation in relation to the network frequency.

44. The network node of items 42, wherein the first and second RATs use the same access technology but the second frequency allocation is different from the first frequency allocation in relation to the network frequency.

45. The network node of any one of items 42 to 44, wherein the allocation information comprises specific carrier frequency of the synchronisation signals.

46. The network node of any one of items 42 to 44, wherein the allocation information comprises a frequency offset for carrier frequency of the synchronisation signal in relation to the network frequency.

47. The network node of any one of items 42 to 46, wherein the RRC message is an RRCConnectionReconfiguration message containing MeasConfig configuring inter-RAT or inter-frequency measurements.

48. The network node of any one of items 42 to 46, wherein the RRC message is an RRCConnectionRelease message with redirectedCarrierInfo or idleModeMobilityControlInfo.

49. The network node of any one of items 42 to 48, wherein the RRC message is transmitted when initiating a handover procedure.

50. The network node of any one of items 42 to 48, wherein the RRC message is transmitted at a connection release procedure.

51. The network node of any one of items 42 to 48, wherein the RRC message is a broadcast message containing cell re-selection information.

52. The network node of any one of items 42 to 51, wherein to determine the allocation information about the synchronisation signals of the second RAT includes that an interface of the network node is arranged to receive through signalling from the cellular communication system information about the second RAT, and the controller is arranged to extract information about the allocation information of the synchronisation signals of the second RAT from the information about the second RAT.

53. The network node of any one of items 42 to 52, wherein to determine the allocation information about the synchronisation signals of the second RAT includes that the controller is arranged to estimate likely allocation information about the synchronisation signals of the second RAT.

54. The network node of any one of items 42 to 53, wherein to determine the allocation information about the synchronisation signals of the second RAT includes that the transceiver is arranged to acquire, through signalling from other wireless devices operating in the cellular communication network, information about the second RAT, and the controller is arranged to extract information about the allocation information of the synchronisation signals of the second RAT from the information about the second RAT.

55. A computer program comprising instructions which, when executed on a processor of a wireless communication device, causes the wireless communication device to perform the method according to any of items 1 to 14.

56. A computer program comprising instructions which, when executed on a processor of a network node, causes the network node to perform the method according to any of items 29 to 41.

The invention claimed is:

1. A method of a wireless communication device of a cellular communication system for mobility from a first radio access network, RAN, operating using a first radio access technology, RAT, to a second RAN operating using a second RAT, wherein the first RAT has synchronisation signals with a first frequency allocation and the second RAT has synchronisation signals with a second frequency allocation in relation to a network frequency for the second RAT, the method comprising:

receiving a radio resource control, RRC, message including allocation information about the synchronisation signals of the second RAT; and performing synchronisation signal detection based on the allocation information.

2. The method of claim 1, wherein the allocation information comprises specific frequency information for the synchronisation signals.

3. The method of claim 1, wherein the allocation information comprises a frequency offset for the synchronisation signal frequency in relation to the network frequency.

4. The method of claim 1, wherein the performing synchronisation signal detection comprises:

changing receiver frequency based on the frequency allocation of the synchronisation signals such that synchronisation signals are comprised in a received bandwidth;

monitoring within the received bandwidth for synchronisation signals; and decoding, upon found synchronisation signals, the synchronisation signals.

5. The method of claim 1, comprising, after performing synchronisation signal detection, tuning the receiver frequency to the determined network frequency.

6. The method of claim 1, further comprising:

determining, upon successful synchronisation, allocation information about the synchronisation signals of the RAT on which the successful synchronisation has been performed; and transmitting, to the network node or neighbouring network nodes of the network node, information about the RAT on which the successful synchronisation has been performed including the information about the allocation information of the synchronisation signals of the RAT on which the successful synchronisation has been performed.

7. A wireless communication device arranged to operate in a cellular communication system and capable of mobility from a first radio access network, RAN, operating using a first radio access technology, RAT, to a second RAN operating using a second RAT, wherein the first RAT has synchronisation signals with a first allocation and the second RAT has synchronisation signals with a second frequency allocation in relation to a network frequency for the second RAT, the wireless communication device comprising:

a transceiver; and a controller, wherein the transceiver is arranged to receive a radio resource control, RRC, message including allocation information about the synchronisation signals of the second RAT, and the controller is arranged to cause the transceiver to perform synchronisation signal detection based on the allocation information.

8. The wireless communication device of claim 7, wherein the allocation information comprises specific frequency information for the synchronisation signals.

9. The wireless communication device of claim 7, wherein the allocation information comprises a frequency offset for the synchronisation signal frequency in relation to the network frequency.

10. The wireless communication device of claim 7, arranged to perform the synchronisation signal detection by being arranged to:
- change receiver frequency of the transceiver based on the frequency allocation of the synchronisation signals such that synchronisation signals are comprised in a received bandwidth;
- monitor within the received bandwidth for synchronisation signals; and
- decode, upon found synchronisation signals, remaining synchronisation signals of a system network access signalling transmission.

11. The wireless communication device of claim 7, arranged to, after performing synchronisation signal detection, tune the receiver frequency of the transceiver to the determined network frequency.

12. The wireless communication device of claim 7, further being arranged to:
- determine, upon successful synchronisation, allocation information about the synchronisation signals of the RAT on which the successful synchronisation has been performed; and
- transmit, to neighbouring network nodes of the network node, information about the RAT on which the successful synchronisation has been performed including the information about the allocation information of the synchronisation signals of the RAT on which the successful synchronisation has been performed.

13. A method of a network node of a cellular communication system for mobility from a first radio access network, RAN, operating using a first radio access technology, RAT, to a second RAN operating using a second RAT, wherein the first RAT has synchronisation signals with a first frequency allocation and the second RAT has synchronisation signals with a second frequency allocation in relation to a network frequency for the second RAT, the method comprising:
- determining allocation information about the synchronisation signals of the second RAT; and
- transmitting a radio resource control, RRC, message including the allocation information about the synchronisation signals of the second RAT.

14. The method of claim 13, wherein the allocation information comprises specific frequency information for the synchronisation signals.

15. The method of claim 13, wherein the determining of the allocation information about the synchronisation signals of the second RAT comprises:
- receiving through signalling from the cellular communication system information about the second RAT; and
- extracting information about the allocation information of the synchronisation signals of the second RAT from the information about the second RAT.

16. The method of claim 13, wherein the determining of the allocation information about the synchronisation signals of the second RAT comprises:
- estimating likely allocation information about the synchronisation signals of the second RAT.

17. The method of claim 13, wherein the determining of the allocation information about the synchronisation signals of the second RAT comprises:
- acquiring through signalling, from other wireless devices operating in the cellular communication network, information about the second RAT; and
- extracting information about the allocation information of the synchronisation signals of the second RAT from the information about the second RAT.

18. A network node arranged to operate in a cellular communication system and capable of assisting handover from a first radio access technology, RAT, to a second RAT, wherein the second RAT has synchronisation signals with a frequency allocation in relation to a network frequency for the second RAT, the network node comprising:
- a transceiver; and
- a controller,
- wherein the controller is arranged to determine allocation information about the synchronisation signals of the second RAT, and
- the transceiver is arranged to transmit a radio resource control, RRC, message including the allocation information about the synchronisation signals of the second RAT.

19. The network node of claim 18, wherein the allocation information comprises specific carrier frequency of the synchronisation signals.

20. The network node of claim 18, wherein the allocation information comprises a frequency offset for carrier frequency of the synchronisation signal in relation to the network frequency.

21. The network node of claim 18, wherein:
- the network node includes an interface that is arranged to receive, through signalling from the cellular communication system, information about the second RAT, and
- the controller is arranged to extract information about the allocation information of the synchronisation signals of the second RAT from the information about the second RAT.

22. The network node of claim 18, wherein:
- the controller is arranged to estimate likely allocation information about the synchronisation signals of the second RAT.

23. The network node of claim 18, wherein:
- the transceiver is arranged to acquire, through signalling from other wireless devices operating in the cellular communication network, information about the second RAT, and
- the controller is arranged to extract information about the allocation information of the synchronisation signals of the second RAT from the information about the second RAT.

24. A nontransitory computer readable storage medium comprising a computer program comprising instructions which, when executed on a processor of a wireless communication device of a cellular communication system, causes the wireless communication device to perform a method for mobility from a first radio access network, RAN, operating using a first radio access technology, RAT, to a second RAN operating using a second RAT, wherein the first RAT has synchronisation signals with a first frequency allocation and the second RAT has synchronisation signals with a second frequency allocation in relation to a network frequency for the second RAT, the method comprising:
- receiving a radio resource control, RRC, message including allocation information about the synchronisation signals of the second RAT; and
- performing synchronisation signal detection based on the allocation information.

25. A nontransitory computer readable storage medium comprising a computer program comprising instructions which, when executed on a processor of a network node of a cellular communication system, causes the network node to perform a method for mobility from a first radio access network, RAN, operating using a first radio access technology, RAT, to a second RAN operating using a second RAT, wherein the first RAT has synchronisation signals with a first frequency allocation and the second RAT has synchronisation signals with a second frequency allocation in relation to a network frequency for the second RAT, the method comprising:

determining allocation information about the synchronisation signals of the second RAT; and    transmitting a radio resource control, RRC, message including the allocation information about the synchronisation signals of the second RAT.

\* \* \* \* \*